(12) United States Patent
Huber

(10) Patent No.: US 7,736,128 B2
(45) Date of Patent: Jun. 15, 2010

(54) STRESS RELIEF GROOVES FOR FRANCIS TURBINE RUNNER BLADES

(76) Inventor: Paul Huber, 163 de Vendee, Laval, Quebec (CA) H7G 2K9

( * ) Notice: Subject to any disclaimer, the term of this patent is extended or adjusted under 35 U.S.C. 154(b) by 367 days.

(21) Appl. No.: 11/367,350

(22) Filed: Mar. 6, 2006

(65) Prior Publication Data
US 2006/0228215 A1    Oct. 12, 2006

(30) Foreign Application Priority Data
Apr. 7, 2005    (CA) .................................. 2503879

(51) Int. Cl.
*F01D 5/22*    (2006.01)
(52) U.S. Cl. .............................. 416/186 R; 416/231 B; 416/235; 416/500
(58) Field of Classification Search ............. 416/186 R, 416/190, 235, 231 B, 228, 500
See application file for complete search history.

(56) References Cited

U.S. PATENT DOCUMENTS

| 4,479,757 A * | 10/1984 | Holmes et al. .......... 416/186 R |
| 7,097,422 B2 * | 8/2006 | Rice et al. .................... 415/134 |
| 7,160,084 B2 * | 1/2007 | Ahmad .................... 416/231 B |
| 2006/0039791 A1 * | 2/2006 | Kim .......................... 416/228 |

FOREIGN PATENT DOCUMENTS

WO    WO 98/05863    2/1998

* cited by examiner

*Primary Examiner*—Edward Look
*Assistant Examiner*—Dwayne J White
(74) *Attorney, Agent, or Firm*—Nixon & Vanderhye P.C.

(57) ABSTRACT

There is disclosed a runner for a Francis-type hydraulic turbine where each runner blade has an outlet edge with two stress relieving grooves cut through the blade from the outlet edge adjacent the crown and the band. The grooves each present an opening across the outlet edge and the grooves each extend a predetermined distance from the outlet edge into the blade.

20 Claims, 2 Drawing Sheets

STRESS RELIEF GROOVES FOR FRANCIS TURBINE RUNNER BLADES

BACKGROUND OF THE INVENTION

The present invention relates to hydraulic machines and in particular to improvements in runner blades for Francis-type machines.

Conventional Francis-type runners comprise a crown with a concentric band or ring and an array of blades extending between and interconnecting the crown with the ring. The runner is rotated about the axis of the crown by the action of water passing through a plurality of flow paths formed between each pair of adjacent blades in the array of blades. Each of the blades has a leading flow dividing edge which defines the line of demarcation between a suction surface leading in the direction of rotation and a trailing pressure surface trailing in the direction of rotation. This edge, at the inlet of the blades, is normally oriented to slope from the band toward the crown to advance in the direction of rotation of the runner. Water enters the periphery of the runner and passes over the blades and leaves the runner axially at the trailing outlet edges of the blades.

More recently, WO 98/05863 published Feb. 12, 1998 to Bilidal et al discloses a runner for a Francis-type hydraulic turbine where each blade has an inlet edge and an outlet edge. The blade is characterized, in the direction of turbine rotation, by the junction point of each blade inlet edge at the band being located forwardly of the inlet edge attachment point for that blade at the crown, and the junction point of each blade outlet edge at the crown being located forwardly of the outlet edge attachment point for that blade at the band. Because of the twisting aspect between the inlet edge and the outlet edge of the blade, this blade is commonly referred to as the "X-blade".

The blades of the aforementioned Francis-type runners may be subject to failure adjacent the junctions of the trailing outlet edge of the blade with the crown and band due to fatigue and/or high stress concentrations adjacent the junctions. In the past, to reduce stress concentrations in the runner blade adjacent these junctions, the blade had a cutout or notch located in the trailing edge of the blade adjacent each of the band and crown. However, this cutout may adversely affect the hydraulic flow of water past the blade which is not acceptable in some applications.

There is a need for an improvement in a runner blade that does not significantly alter blade contour, reduces stress concentrations adjacent the junctions of the blade outlet edge to the crown and the blade outlet to the band, and does not adversely affect the hydraulic flow of water past the blade.

BRIEF DESCRIPTION OF THE INVENTION

The present invention relates to a runner for a Francis-type hydraulic turbine where each runner blade has an outlet edge with at least one stress relieving groove cut through the blade from the outlet edge adjacent at least one of the crown and the band. The groove presents an opening across the outlet edge and the groove extends a predetermined distance from the outlet edge into the blade.

In accordance with an embodiment of the invention there is provided a runner for a Francis-type hydraulic turbine comprising a band, a crown and a plurality of blades having a curved shape and being attached to the band and the crown. Each blade comprises an inlet flow dividing edge adapted to face upstream in the turbine and an outlet edge adapted to face downstream from the turbine towards a draft tube. The outlet edge extends between the crown and the band. Each blade comprises at least one stress relieving groove cut through the blade from the outlet edge adjacent at least one of the crown and the band. The groove presents an opening across the outlet edge and the groove extends a predetermined distance from the outlet edge into the blade.

In one embodiment, each blade has two grooves, one adjacent each of the crown and the band.

In another embodiment the groove terminates in a rounded end portion that extends through the blade. In another embodiment, the groove has a constant width and the rounded end portion has a diameter greater than the constant width of the groove. In another embodiment, the rounded end portion is located in a portion of the blade that is thicker than the outlet edge of the blade adjacent the opening for the groove.

In another embodiment, each groove comprises a first portion extending from the opening that curves away from a corresponding one of the crown and the band, and an intermediate portion that is hook shaped terminating in the rounded end portion of the groove.

Advantage is found with the stress relief groove utilized in the present invention because the groove effectively transfers load from the outlet edge of the blade adjacent the band and/or crown to an end portion of the groove in the blade. In the embodiment where the end point of the groove terminates in a rounded end portion of diameter larger than the groove width, the peripheral surface about the rounded end portion distributes the stress thereabout into the blade. In the embodiment where the rounded end portion is located in a thicker portion of the blade configuration than that of the outlet edge, this thicker portion of the blade is better able to withstand the effects of the stress concentrations transferred thereto.

BRIEF DESCRIPTION OF THE DRAWINGS

For a better understanding of the nature of the present invention reference may be had by way of example to the accompanying diagrammatic drawings in which.

DETAILED DESCRIPTION OF THE INVENTION

The present invention relates to hydraulic machines and in particular to improvements in runners for Francis-type machines.

Figure 1:
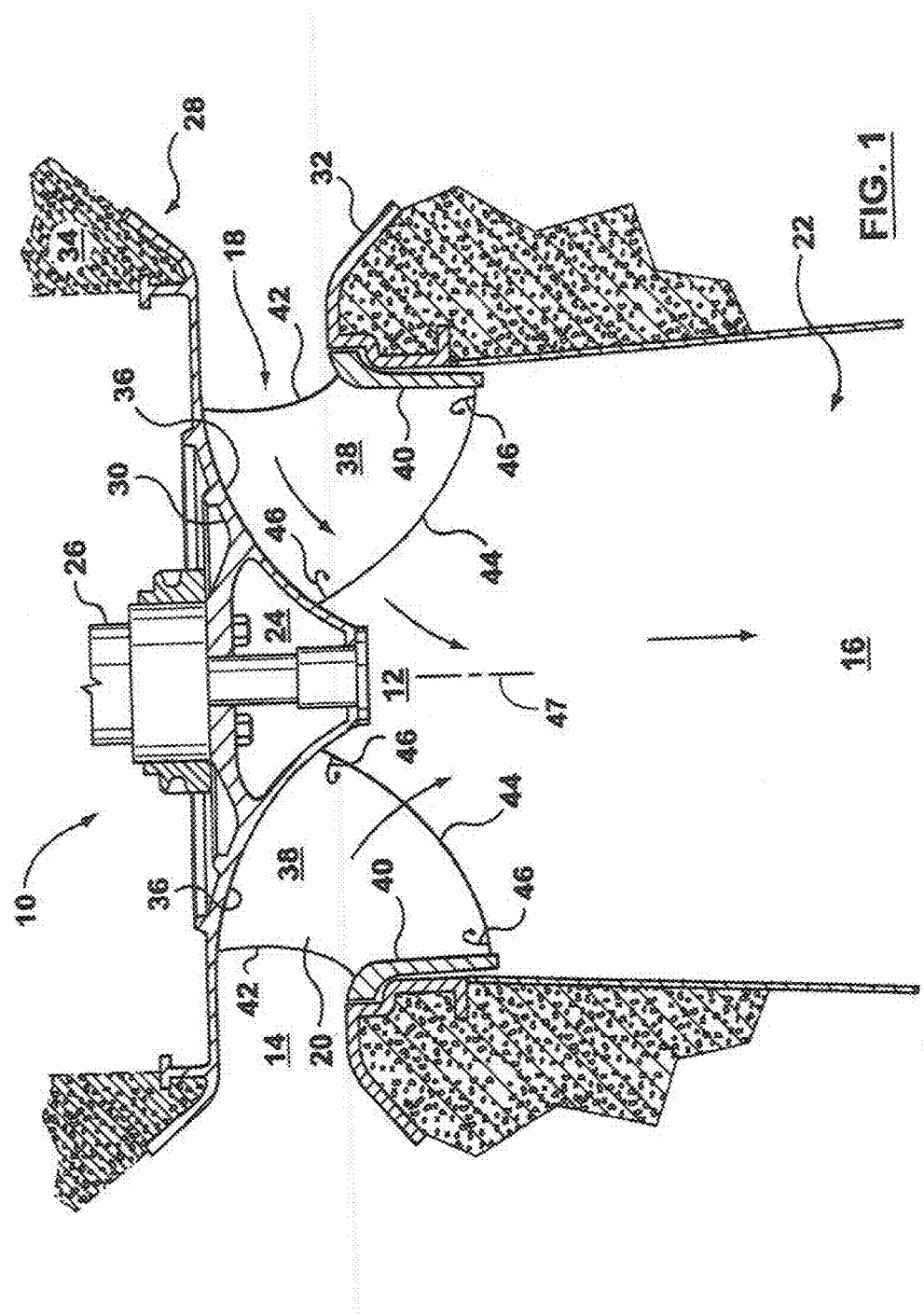
FIG. 1 is an elevation view, partially in cross-section, of a Francis turbine showing runner blades with the stress relief grooves of the present invention.

Referring to FIG. 1, an exemplary turbine installation 10 is illustrated for use in the generation of hydroelectricity which may benefit from the present invention. The installation 10 has a water passageway 12. Water flows from an inlet 14 of passageway 12 to an outlet 16 located at a lower elevation. The water passageway 12 passes through a Francis turbine 18 having a runner 20 and a draft tube 22. The runner 20 is secured by bolts 24 to a shaft 26 transmitting energy to a generator (not shown). The turbine 18 is mounted in a stationary casing 28 having a head cover 30 and a bottom discharge ring 32. The head cover 30, discharge ring 32 and draft tube 22 are embedded in concrete foundation 34. It should be understood that installation 10 includes other components such as, for example, stay vanes and wicket gates which are not shown.

Runner 20 is mounted for rotation in casing 28. The runner comprises a crown 36, and a plurality of circumferentially spaced runner blades 38 and an enclosing band 40. The plurality of blades 38 have a curved shape and are attached, usually by welding, bolts, or by being molded in place, to the band 40 and the crown 36. Each blade 38 comprises an inlet flow dividing edge 42 adapted to face upstream in the turbine 18 and an outlet edge 44 adapted to face downstream from the turbine 18 towards the draft tube 16. The outlet edge 44 extends between the crown 36 and the band 40 and is usually a thin section of the blade 38. Where the blade meets the crown and band there is a fillet to reduce the stress concentration.

In accordance with the illustrated embodiment of the present invention, each blade 38 comprises two stress relief grooves 46. One of the grooves 46 is located adjacent the crown 36 and the other groove 46 is located adjacent the band 40. It should be understood that in alternative embodiments the groove 46 may be located either solely adjacent the band 40 or solely adjacent the crown 36 of each blade 38. However, such alternative embodiments only enjoy partial benefit of the present invention.

Figure 2:
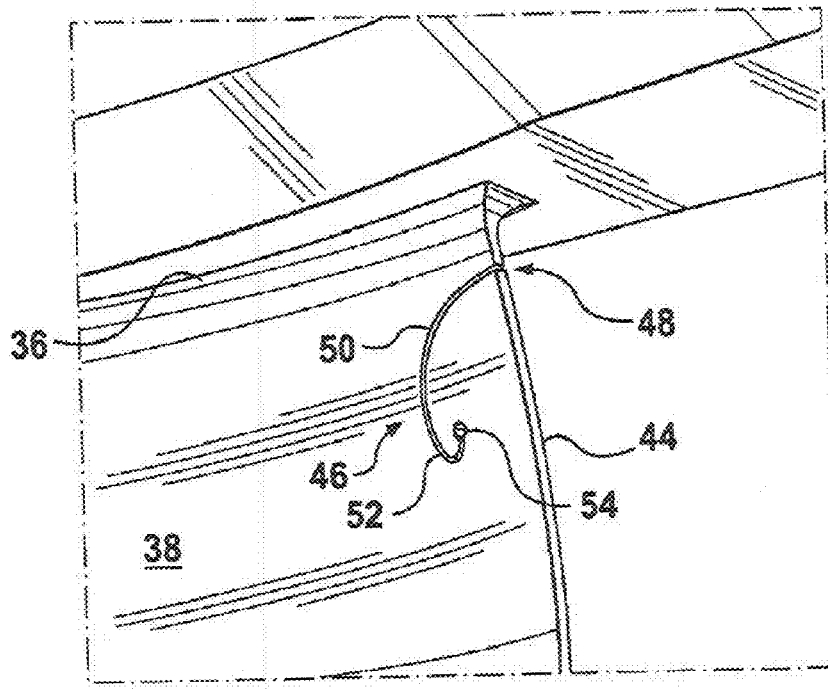
FIG. 2 is an enlarged perspective view showing a stress relief groove in the blade adjacent the crown; and, FIG. 3 is an enlarged perspective view showing another stress relief groove in the blade adjacent the band.
Figure 3:
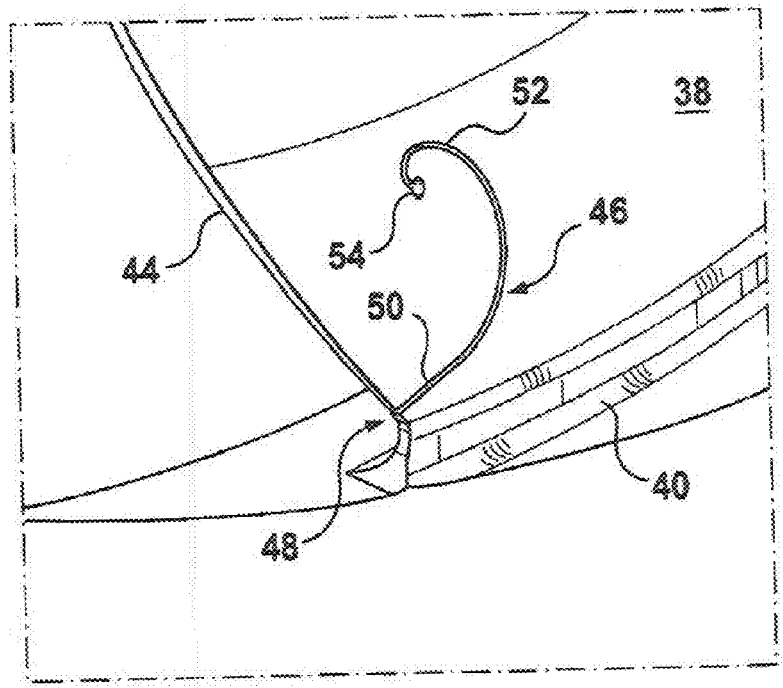

Reference may be had to FIG. 2 which shows an enlarged portion of the blade 38 showing the groove 46 adjacent the crown 36. Reference may also be had to FIG. 3 showing the groove 46 adjacent the band 40. Each of the stress relief grooves 46 is located at areas of relatively high stress concentration on the runner blades 38. These high stress concentration areas are known to be in proximity to or adjacent to either the crown 36 or the band 40. The groove 46 is cut into and through the blade 38 so that the groove 46 extends between pressure and suction faces of the blade 38. The groove 46 presents an opening 48 that extends across the outlet edge 44. The groove 46 also extends a predetermined distance from the outlet edge 44 into the blade 38. As best seen in FIGS. 2 and 3, each of the grooves 46 comprises a first portion 50 that extends from the opening 48 and curves away from its corresponding adjacent crown 36 shown in FIG. 2 and band 40 shown in FIG. 3. Each of the grooves 46 further comprises an intermediate portion 52 which is shown in the drawings to have a hook shape. Portions of each groove 46 are oblique to a rotational axis 47 of the turbine. It should be understood that the curving and hooked shape nature of the groove 46 facilitates the location of the rounded end portion 54 of the groove 46 in the blade 38. In an alternative embodiment, the groove 46 may extend directly from the opening 48 to the rounded end portion 54 with little or no curvature.

In the illustrated embodiment, the first portion 50 and the intermediate portion 52 of each groove 46 have a constant width. In practice this width may be in the order of 0.135 inches. The rounded end portion 54 is circular in shape and has a diameter that is greater than the constant width of the groove 46. In practice the diameter of the rounded end portion 54 for the illustrated embodiment is about 0.500 inches. It should be understood that other suitable dimensions may be employed. It should be understood that the rounded end portion 54 is located in a portion of the blade 38 that is thicker than the outlet edge 44 of the blade 38 adjacent the opening 48 for the groove 46.

The groove 46 effectively transfers load from the outlet edge 44 of the blade adjacent the opening 48 along the groove to the rounded end portion 54. The rounded end portion 54 is surrounded by a peripheral surface that effectively receives the loads from the outlet edge 44 of the blade 38 and distributes these loads thereabout. The opening 48 for each groove 46 is located where the stress concentrations on the outlet edge 44 of the blade are high. In the blade design, these concentrations are known to be high in the outlet edge 44 adjacent both the crown 36 and the band 40.

While the invention has been described in terms of various specific embodiments, those skilled in the art will recognize that the invention can be practiced with modifications within the spirit and scope of the present invention.

What is claimed is:

1. A runner for a Francis-type hydraulic turbine, comprising a band, a crown and a plurality of blades having a curved shape and being attached to the band and the crown, each blade comprising an inlet flow dividing edge adapted to face upstream in the turbine and an outlet edge adapted to face downstream from the turbine towards a draft tube, the outlet edge extends between the crown and the band, and each blade comprising at least one stress relieving groove cut through the blade from the outlet edge adjacent at least one of the crown and the band, the groove presenting an opening across the outlet edge, the groove extending a predetermined distance from the outlet edge into the blade to transfer load from the outlet edge of the blade adjacent the at least one of the crown and the band to an end portion of the groove in the blade, and the groove extending obliquely with respect to a rotational axis of the turbine, wherein the groove in each blade comprises two stress relieving grooves, one of the stress relieving grooves located adjacent the crown and the other of the stress relieving grooves located adjacent the band.

2. The runner for a Francis-type hydraulic turbine of claim 1 wherein each of the grooves terminates in a rounded end portion that extends through the blade.

3. The runner for a Francis-type hydraulic turbine of claim 2 wherein each of the grooves has a constant width and the rounded end portion has a diameter greater than the constant width of each of the grooves.

4. The runner for a Francis-type hydraulic turbine of claim 2 wherein the rounded end portion is located in a portion of the blade that is thicker than the outlet edge of the blade adjacent the opening.

5. The runner for a Francis-type hydraulic turbine of claim 3 wherein the rounded end portion is located in a portion of the blade that is thicker than the outlet edge of the blade adjacent the opening.

6. The runner for a Francis-type hydraulic turbine of claim 1 wherein each of the groove comprises a first portion extending from the opening that curves away from a corresponding one of the crown and the band, and a second portion extending towards the corresponding one of the crown and the band, wherein the second portion terminates in the end portion.

7. The runner for a Francis-type hydraulic turbine of claim 1 wherein each of the grooves comprises a first portion extending from the opening that curves away from a corresponding one of the crown and the band, and an intermediate portion that is hook shaped terminating in a rounded end portion.

8. The runner for a Francis-type hydraulic turbine of claim 7 wherein the first and intermediate portions have a constant width and the rounded end portion has a diameter greater than the constant width.

9. The runner for a Francis-type hydraulic turbine of claim 8 wherein the rounded end portion is located in a portion of the blade that is thicker than the outlet edge of the blade adjacent the opening.

10. The runner for a Francis-type hydraulic turbine of claim 7 wherein the rounded end portion of the groove is located in a portion of the blade that is thicker than the outlet edge of the blade adjacent the opening for the groove.

11. The runner for a Francis-type hydraulic turbine of claim 1 wherein the groove terminates in a rounded end portion that extends through the blade.

12. The runner for a Francis-type hydraulic turbine of claim 11 wherein the groove has a constant width and the rounded end portion has a diameter greater than the constant width of the groove.

13. The runner for a Francis-type hydraulic turbine of claim 11 wherein the rounded end portion is located in a portion of the blade that is thicker than the outlet edge of the blade adjacent the opening for the groove.

14. The runner for a Francis-type hydraulic turbine of claim 12 wherein the rounded end portion is located in a portion of the blade that is thicker than the outlet edge of the blade adjacent the opening for the groove.

15. The runner for a Francis-type hydraulic turbine of claim 1 wherein the groove comprises a first portion extending from the opening that curves away from a corresponding one of the crown and the band.

16. The runner for a Francis-type hydraulic turbine of claim 1 wherein the groove comprises a first portion extending from the opening that curves away from a corresponding one of the crown and the band, and an intermediate portion that is hook shaped terminating in a rounded end portion of the groove.

17. The runner for a Francis-type hydraulic turbine of claim 16 wherein the first and intermediate portions of the groove have a constant width and the rounded end portion has a diameter greater than the constant width.

18. The runner for a Francis-type hydraulic turbine of claim 17 wherein the rounded end portion of the groove is located in a portion of the blade that is thicker than the outlet edge of the blade adjacent the opening for the groove.

19. The runner for a Francis-type hydraulic turbine of claim 16 wherein the rounded end portion of the groove is located in a portion of the blade that is thicker than the outlet edge of the blade adjacent the opening for the groove.

20. A runner for a Francis-type hydraulic turbine rotatable in an annular plane of rotation generally parallel to a water inlet for the turbine and the turbine having a water outlet discharging water to flow into an outlet passage generally perpendicular to the annular plane of rotation, the runner comprising:

a conical crown mounted to a rotating head cover of the turbine, the crown extending along a curve from the plane of rotation towards a water discharge direction generally parallel to the water outlet passage;

an annular band extending from the water inlet to the water outlet passage, wherein at least a portion of the annular band is generally parallel to the water outlet passage, and a plurality of blades extending between the band and crown, each blade comprising an inlet flow dividing edge adapted to face upstream towards the water inlet and an outlet edge adapted to face downstream towards the water outlet passage, the outlet edge forms a curve extending from the crown to the band wherein the curve turns through angles oblique to an axis of rotation, and each blade includes at least one stress relieving groove extending through a width of the blade and starting at the outlet edge and extending into the blade along a path oblique to the axis of rotation, wherein the at least one stress relieving groove includes a first groove proximate to the crown and a second groove proximate to the band.

* * * * *